ively cool heating chamber. Prolonged exposure
United States Patent Office

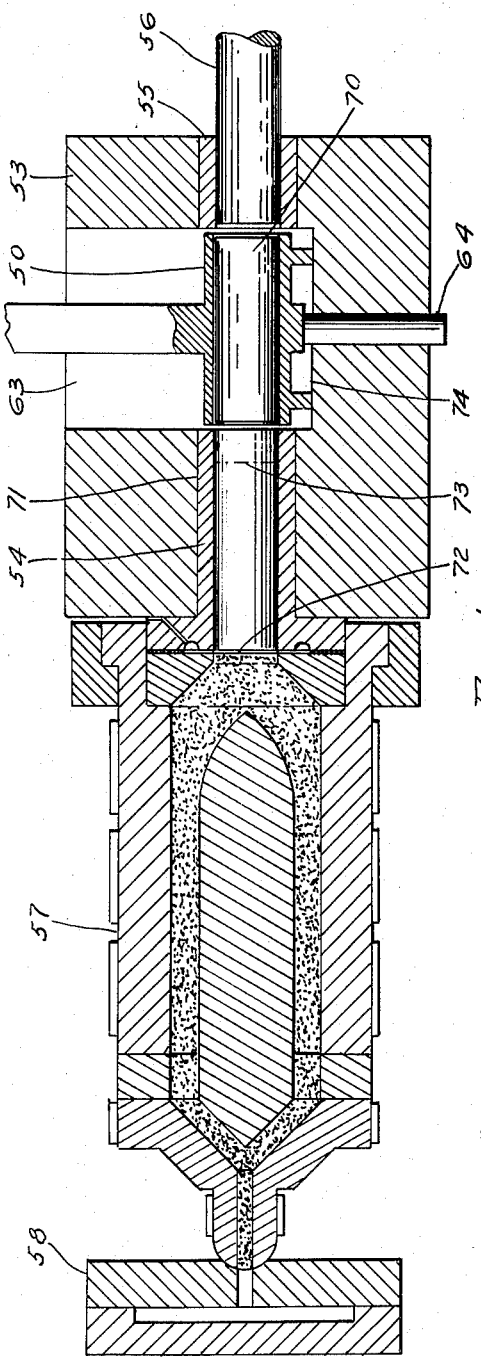
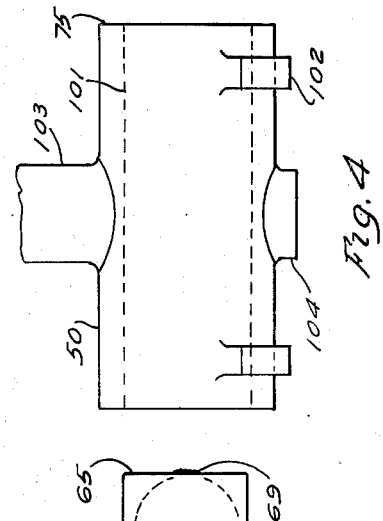
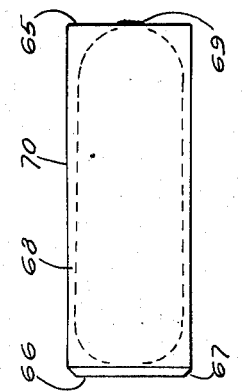
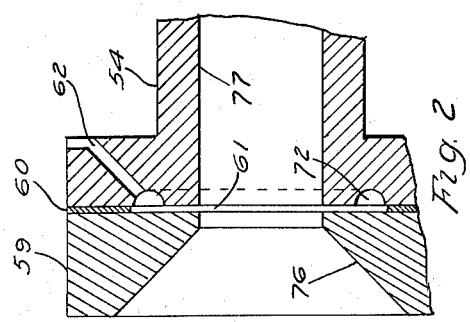

2,954,586
Patented Oct. 4, 1960

2,954,586

METHOD AND APPARATUS FOR INJECTION MOLDING

George W. Wacker, 4762 Reading Road, Cincinnati 37, Ohio

Original application Jan. 17, 1955, Ser. No. 482,321. Divided and this application May 9, 1958, Ser. No. 734,240

2 Claims. (Cl. 18—30)

This application is a division of application 482,321, filed January 17, 1955, now abandoned, and the invention relates to the injection molding of plastic materials. More specifically, this invention concerns the method and apparatus for injection molding by the use of "packaged" molding material to obtain certain benefits to be derived from the use of "preplasticated" molding material.

The main object of this invention is to provide an injection assembly for an injection molding machine which is adapted to use a cylindrical package of thermoplastic molding material prepared in means separate from the said injection assembly, the said package consisting of a definite volume of hot, fluid molding material, heated short of injection fluidity and enclosed in an integrally formed container having congealed side and end walls. The said volume is sufficient to exactly fill the mold being worked, the word "exactly" being advisedly used to avoid a dissertation on the subject of the effect of heat and pressure on the volume of molding materials.

Heretofore, it has been customary to supply injection molding machines with hard, granular molding material. This material is forced through the restricted passages of the single heating means of the machines by the injection plunger on the injection stroke. In doing so, up to half of the thrust of the plunger is dissipated. Only about half of the rated injection pressure remains available for actually forcing the heated material into the mold, up to the instant the mold is filled.

In the practice of this invention, substantially all of the thrust of the injection plunger is devoted to the single task of forcing material into the mold. Therefore the injection press using this invention can operate on injection pressures drastically reduced from orthodox practice.

Another advantage is the fact that up to 80 percent of the required heat load is already in the package of material when it is inserted into the injection assembly of this invention. It follows that the heating requirements of this assembly are substantially below those of the orthodox machines, and the heating means of this apparatus can operate at relatively low temperatures which greatly reduces the danger of overheating or degrading material during the operation of the press.

Still another advantage resides in the fact that each package of material, when inserted in the injection assembly, presents a congealed, distortable end wall to the end of the injection plunger of the assembly. This congealed material serves as an effective seal to prevent the leakage of molding material under pressure past the plunger, thereby avoiding stuck and gauled plungers.

One more advantage becomes apparent because each package contains exactly the proper volume of material to fill the mold without excessive packing. For this reason, a "bottoming" type plunger can be used, and the clamping tonnage of the press can be substantially reduced without possibility of flashing the mold.

In the operation of this apparatus, the material flow procedure is "first in, first out." When the plunger is retracted, no material can remain in that portion of the pressure cylinder which has been swept by the plunger, nor can material adhere to, or be moved with, the plunger when it is retracted. Therefore there is no residue of material left in the pressure cylinder to give trouble when changing material or color.

This improved method of injection molding provides for two separate periods of heating of the plastic material. The first heating occurs during the preparation of the package as disclosed in the co-pending divisional application No. 736,436, filed May 12, 1958 by this applicant, entitled Method and Apparatus for Packaging Fluid Molding Material, at which time the material is heated from room temperature to its flow temperature, or a rise of approximately 250 degrees F. This first heating will not degrade the material because there will be no reason to expose the material for an overlong period to the heating temperature, due to the "storage" method disclosed.

The second heating takes place After the package has been transferred to the injection molding machine, and after the relatively cool injection plunger has forced the package thru the relatively cool pressure chamber, during which process the package has lost some heat. To now raise the temperature of the material constituting the package to its proper degree of fluidity and uniformity for injection into the mold requires an additional rise of only approximately 50 degrees, which can be accomplished in a relatto this temperature due to an interruption of the press cycle will not overheat nor degrade the material.

In the drawings:

Figure 1 is a schematic drawing showing a section through an injection assembly of this invention, with the parts in their relative positions just after a transfer sleeve holding a package of material has been inserted into the assembly, with the sleeve alined with the injection plunger. The location of the air vent is clearly shown. The plunger is now ready to be advanced to fill the empty mold with twice heated material.

Figure 2 is an enlarged fragmentary sectional view of the flange end of the pressure chamber of the assembly showing the construction of a single port air vent for purging off trapped air.

Figure 3 is an outline drawing of a cylindrical package of heated thermoplastic molding material intended to show its functional features insofar as they relate to the method and apparatus of this invention.

Figure 4 shows a portable transfer sleeve of a type required for the operation of the apparatus of this invention, and intended to point out functional features relating to the method and apparatus of this invention.

Description

Essentially, the injection assembly Fig. 1, consists of a housing 53, a pressure cylinder 54, a plunger guide bushing 55, an injection plunger 56, and a heating chamber assembly 57. An air vent Fig. 2, at the discharge end of the pressure cylinder, is also an important part. One or more transfer sleeves Fig. 4 are required to operate the assembly.

The housing 53 is provided with a throat 63 open at the top, and machined at the bottom to suit locating lugs 102 on the transfer sleeve 50. The housing includes a tunnel bored at right angles to the throat and passing through the throat in a manner to divide the tunnel into a long end and a short end.

The pressure cylinder 54 has a flange at one end, and a bore open at both ends to fit the injection plunger 56. It fits into the long end of the tunnel. The injection plunger guide bushing 55 has a bore to fit the plunger and is assembled into the short end of the tunnel 71. Both the pressure cylinder and the guide bushing terminate at the throat opening to provide a space between cylinder and bushing to accommodate the transfer sleeve.

The injection plunger 56 is advanced and retracted by a hydraulically operated mechanism (not shown) in the conventional manner. When retracted, the plunger is positioned in the guide bushing and clear of the transfer sleeve space in the throat. When it is advanced the plunger passes through the bushing and the throat to operate in the pressure cylinder.

The heating chamber assembly 57 is fitted with a torpedo, a chamber cap, a nozzle, a clamp ring and necessary heating means. It fits over the flange of the pressure cylinder, and the clamp ring serves to hold the heating chamber into leak proof operative association with the flanged end of the pressure cylinder.

The air vent Fig. 2 consists of a vent disc 59 having a bore 77 and a flared wall 76 adapted for operative association with the flange of the pressure cylinder, by forming an annular port 61 at the end of the bore of the pressure cylinder when the vent shim 60 is assembled between the flange and disc. The port communicates with an annular groove 72 formed in the flat surface of the flange, and a passage 62 connects the groove with the atmosphere. The width of the port will not exceed .010 inch and is easily reduced to meet operating conditions by changing the shim. To meet certain conditions of service, the vent can be made with a plurality of discs and shims, to provide more than one port to purge the trapped air.

It is necessary to keep the vent port 61 relatively cool, so cooling means (not shown) are provided to control the operating temperature of the pressure cylinder 54 and its flange. It is also desirable to provide means (not shown) to keep the nose of the injection plunger 56 cool at all times.

A control rod 64 is provided in the housing to operate a limit switch adapted to permit the initiation of the advance stroke of the plunger when the transfer sleeve is inserted in the throat in proper alinement with the plunger.

Operation

The operation of the injection assembly begins with the selection of a package of heated thermoplastic molding material of a size to fit the pressure cylinder of the assembly and of the proper volume to exactly fill the mold to be operated. This package is prepared in the manner and by the apparatus disclosed in my pending application filed May 12, 1958, numbered 736,436 and entitled, "Method and Apparatus for Packaging Fluid Molding Material." The word "exactly" is used advisedly to avoid a long dissertation on the effects of temperature and pressure on the volume of heated plastic molding material.

The selected package is placed in a transfer sleeve fitting the assembly as shown in Fig. 4, and the loaded transfer sleeve is then moved manually to the injection press and inserted in the throat of the injection assembly. The sleeve has lugs 102 which rest in a machined nest in the bottom of the throat to position the sleeve in proper alinement with the retracted injection plunger of the assembly. By properly locating the sleeve the advance control rod 64 of the assembly will be depressed to operate a limit switch adapted to permit the initiation of the advance of the injection plunger.

A preferred method of operating a molding unit comprising a machine for packaging the heated material and a separate injection molding machine adapted to use the packages is to accumulate a bank of packages in a storage station before starting the injection machine. The packages are left in the transfer sleeve used to remove them from the packaging machine during their stay in the storage station while waiting their turn to be used.

The injection plunger will advance on the injection stroke to pass through the transfer sleeve and to thereby slide the package out of the sleeve and into the vacant space in the bore of the pressure cylinder left when the plunger was retracted on the previous press cycle. The effort required to slide the package is negligible and the hot package is not distorted.

By the time the package encounters the wall of material which temporarily blocks the bore, left by the previously worked package, the plunger will have entered the bore. At this stage the plunger will begin to exert thrust against the package first to expand the package tightly against the bore. This will trap a quantity of air which now cannot escape via the plunger clearance. This air will temporarily accumulate in the annular space provided by the chamber 67 of the package, which space will subsequently be obliterated by the plunger pressurue.

This air space is adjacent the circular vent port 61 in the bore and the trapped air will be purged off by passing through the port into the vent groove 72 and passage 62 to the atmosphere. The width of the vent port is adjusted to suit conditions by changing the vent shim 60 which is made in thicknesses from .010 down to .002 inch, to permit the passage of air but to block the passage of molding material. The soft, flowable material in the package 70 is surrounded by the congealed side wall 68 and the congealed end walls 65—66, Fig. 3, and cannot reach the port. The congealed material will not enter the port. Under certain service conditions, more than one port may be required and can be provided by using a plurality of vent discs, shims and grooves. If the trapped air is not purged off, the heat developed by the compression of the air can cause black streaks and other defects in the work.

As the plunger continues to advance after purging the air from the bore, the package of material is forced through the pressure cylinder into the heating chamber. Inasmuch as the material comprising the package has substantially the same compression ratio as the material undergoing the second heating in the heating chamber, a volume of material, uniformly heated to the proper injection temperature and of substantially the same volume as the package, will be displaced and forced from the heating chamber through the nozzle into the mold 58 to exactly fill the cavity and associated passages.

With this method of molding, the injection plunger is advanced its full stroke each press cycle and will deliver a definite volume of material each shot to prevent packing the mold sufficiently to flash, and to avoid short shots, using less mold clamping tonnage than orthodox machines. The method also assures that the space in the pressure cylinder which is swept by the plunger is absolutely clean of material to facilitate changing material or color.

An important feature is the fact that no hot, fluid molding material comes in contact with the end of the injection plunger to leak past the plunger and cause damage by sticking the plunger or gauling both plunger and bore. Instead, the material comprising the end wall of the package which is against the end of the plunger is congealed and distortable to serve as a very effective seal against plunger leakage.

With this method there has been no granular molding material involved to complicate volumetric measurement of the charge or to rob the injection plunger of part of its thrust. All the thrust of the plunger is devoted to the single task of forcing material into the mold.

By this method of using a preplasticated charge of material, all material which has been heated to fluidity is protected against exposure to air which prevents possible discoloration. Furthermore, material which has been heated to injection temperature is confined under pressure to avoid undesirable expansion and gassing, up to the instant of injection into the mold.

By this method of using a preplasticated charge of material, each shot may be inspected for color, clarity and volume before being inserted into the injection assembly.

And in the event of a prolonged delay in the operation of the injection press due to mold or other trouble, the preplasticated material, or packages, may be salvaged instead of being degraded by too long exposure to high heating temperature.

The plunger of the ordinary injection assembly never quite completes its possible advance stroke in normal operation. Instead the advance of the plunger is halted short of the end of the possible stroke by the back pressure of the material which has been forced into the mold. However, the plunger of this invention does always fully complete its possible stroke to bring the end of the plunger in line with the circumferential vent port at the discharge end of the pressure cylinder. This operation of the plunger satisfies two requirements. First, to force all the material which did comprise the package through the pressure cylinder and past the vent port, simultaneously forcing a like volume of material from the heating chamber assembly through the nozzle into the mold. Second, that the congealed end wall of the package abutting the end of the plunger be always positioned in the bore of the pressure cylinder to expose the vent port and assure the proper purging of any air trapped during the expansion of the next worked package.

Fig. 3 of the drawing shows the general structure of the package of material 70 used in the injection assembly of this invention. Of cylindrical shape, the outer diameter is made an easy fit into the bore 77 of the pressure cylinder, Fig. 2. The full cornered end wall 65 is positioned at end 75 of the transfer sleeve 50, Fig. 4, so that it will abut against the end of the plunger 56 during the operation of the injection assembly. The other end wall 66 is chamfered at 67 to provide momentary access to the vent port 61, Fig. 2, in the bore of the pressure cylinder. An area of relatively soft material remaining after the forming of the package is shown at 69. The dotted line 68 denotes the diffused demarcation between the hot fluid contents of the package and the cool distortable end walls 65 and 66 and the side wall.

The word "package" as used in this specification shall mean a distortable cylindrical mass of thermoplastic molding material of a diameter to suit a pressure cylinder assembly, and containing a volume of material sufficient to exactly fill a mold, and comprising material heated to a fluid condition short of injection temperature, and enclosed in integral side and end walls of congealed material capable of temporarily maintaining dimensional stability. The word "cool" shall mean a temperature at which the molding material is not fluid, or less than 175 degrees F.

Fig. 4 of the drawing shows the general structure of a portable transfer sleeve used with this invention. It comprises a tubular section having a bore 101 into which a package of material fits freely. The tube is provided with a handle 103 and lugs 102 which locate the sleeve in the throat 63 of the housing 53 of the injection assembly. A boss 104 is provided to operate a push rod 64, Fig. 1 to permit the initiation of the advance stroke of the plunger when the sleeve is properly located in the throat. One end 75 is marked for identification so that it may be positioned toward the plunger when the sleeve is manually inserted in the throat, to always have the end 65 of the package facing the plunger. The transfer sleeve is used to hold a package and transfer it from the package making assembly direct to the injection assembly, or to hold a package in a storage station prior to moving it to the injection assembly.

Having described my invention, I claim:

1. In an injection assembly using cylindrical packages of partly heated thermoplastic molding material, the combination comprising a housing having a throat to receive a transfer sleeve and a pressure cylinder assembly tunnel, a pressure cylinder assembly mounted in said tunnel, said assembly having a bore with a circumferential vent port adjacent the discharge end of said bore, means to cool the pressure cylinder assembly including the vent port, an injection plunger adapted to operate in the bore of the pressure cylinder assembly, means to advance the plunger its full stroke into the bore to position the end of the plunger in line with the vent port, a heating chamber assembly in flow communication with the pressure cylinder assembly, means to maintain the heating chamber assembly at the temperature necessary to heat its contents to full injection temperature, an injection nozzle at the discharge end of the heating chamber assembly, means to maintain the injection nozzle at injection temperature, and a manually operated, portable transfer sleeve consisting of a cylindrical section, a handle attached to the cylindrical section, locating lugs extending from the cylindrical section, a switch rod actuating boss on the cylindrical section, the said transfer sleeve being adapted for insertion into the throat of the housing, and for holding a package of material in a storage station.

2. The apparatus of claim 1 in which the pressure cylinder assembly comprises a substantially tubular cylinder having a straight bore and a flange at the discharge end, a vent groove formed in the end surface of the flange, a passage connecting the vent groove with the atmosphere, an annular vent shim of selected thickness but not to exceed .010 inch and the diameter of the cylinder flange with a hole exposing the vent groove, a vent disc the diameter of the cylinder flange and with a bore same as the cylinder bore, flaring to suit the mouth of the heating chamber assembly, the said vent shim and the vent disc when assembled with the cylinder flange forming a circumferential vent port the width of the selected shim in the bore of the pressure cylinder assembly adjacent the discharge end.

References Cited in the file of this patent

UNITED STATES PATENTS

| 2,454,661 | Lester et al. | Nov. 23, 1948 |
| 2,477,258 | MacMillin | July 26, 1949 |

FOREIGN PATENTS

| 629,228 | Great Britain | Sept. 15, 1959 |